United States Patent [19]

Kito et al.

[11] Patent Number: 5,438,389

[45] Date of Patent: Aug. 1, 1995

[54] PHOTOGRAPHIC PRINTING METHOD AND SYSTEM

[75] Inventors: Eiichi Kito; Tsutomu Kimura; Junji Sugano, all of Kanagawa, Japan

[73] Assignee: Fuji Photo Film Co., Ltd., Kanagawa, Japan

[21] Appl. No.: 260,218

[22] Filed: Jun. 14, 1994

[30] Foreign Application Priority Data

Jun. 14, 1993 [JP] Japan .................. 5-142241

[51] Int. Cl.$^6$ ............................................. G03B 27/73
[52] U.S. Cl. ......................................... 355/38; 355/41; 355/68; 355/71
[58] Field of Search ................ 355/37, 38, 41, 68, 355/71

[56] References Cited

FOREIGN PATENT DOCUMENTS 59-7374 2/1984 Japan ..................... G03B 27/73

Primary Examiner—Michael L. Gellner
Assistant Examiner—Daniel P. Malley
Attorney, Agent, or Firm—Sughrue, Mion, Zinn, Macpeak & Seas

[57] ABSTRACT

A film analyzer calculates exposure correction amounts for red, green, and blue colors in an image of an original frame of a spliced long film by using the characteristic values of a scene determined from the output of a color image sensor. For a low LATD frame having a minimum value of three-color LATDs smaller than a reference value, a density of an ND filter to be used for printing is calculated in accordance with a difference between the minimum value and the reference value. The long film is loaded into an auto-printer from the film analyzer. A photometry sensor measures three-color LATDs of an original frame set to a print station of the auto-printer. A print exposure time of each color is calculated from the three-color LATDs and exposure correction amounts. Immediately before the low LATD frame is set to the print station, an ND filter having the density determined in advance is inserted into a printing path. Three-color LATDs are measured while the ND filter is inserted into the printing path.

11 Claims, 3 Drawing Sheets

PHOTOGRAPHIC PRINTING METHOD AND SYSTEM

BACKGROUND OF THE INVENTION

1. Field of the Invention

The present invention relates to a photographic printing method and system, and more particularly, to a printing method and system in which a neutral density (ND) filter is used for printing an image having a low large area transmittance density (LATD).

2. Description of the Related Art

In order to perform photofinishing efficiently at a large laboratory, 50 to 100 rolls of photographic film are spliced together to obtain a spliced long film. This long film is loaded into a film processor, developed, and supplied to a notch puncher which performs a film inspection. At the notch puncher, a frame is automatically detected, and original frames are sequentially supplied to an inspection station. An original frame supplied to the inspection station is visually checked to determine whether it is to be printed. If it is to be printed, a semicircular notch is formed in the side portion on a central line of the original frame.

Next, the long film is loaded into a film analyzer (also called a scanner), and original frames are sequentially supplied to a photometry station. An image sensor is provided at the photometry station to measure a transmittance density of each point of the original frame. A minimum density, a maximum density, an LATD at the central area of the frame, an LATD at the peripheral area of the frame, an LATD at the upper half area of the frame, and an LATD at the lower half of the frame are obtained from the transmittance density at each point of the original frame. In accordance with these characteristic values, scenes of original frames are classified. In accordance with the scene classification, an exposure correction amount is calculated. This exposure correction amount is written into a storage medium such as a paper tape, a magnetic tape, or an LSI card.

The long film and storage medium are removed from the film analyzer and are loaded into an auto-printer. Each original frame of the long film is automatically and sequentially supplied to a print station within the auto-printer, and an average transmittance density of the whole area of the frame (LATD) is measured. An exposure time is calculated from the LATD and the exposure correction amount read from the storage medium. The original frame is printed at this exposure time onto a photographic paper. After all of the original frames of the long film have been printed, the photograph paper is developed by a paper processor, and thereafter it is cut into each photoprint.

In the case of a color negative film, a color image sensor is used to measure three primary colors including red, green, and blue at each point of an original frame. By using an average value (grey density) of the three colors, a scene classification is carried out. In accordance with the scene classification, exposure correction amounts for the three colors are calculated. At the auto-printer, three sensors measure LATDs of red, green, and blue. In accordance with the LATDs and exposure correction amounts for the three colors, an exposure time for each color is calculated. The control of the exposure time for each color is performed by a black shutter, a red cut-filter (cyan filter), a green cut-filter (magenta filter), and a blue cut-filter (yellow filter). Specifically, after the black shutter is opened and an exposure time of some color lapses, the corresponding cut-filter is inserted into a printing path.

Since the exposure time is related to an LATD of an original frame, the exposure time becomes very short, such as several tens of milliseconds (ms), in the case of an under exposed frame having a low LATD exposure. If the exposure time is short, the influence of an operation delay time of the black shutter or cut-filter becomes significant, resulting in incorrect exposure control. In order to set an exposure time for an under exposed frame to a proper time, a printing light source having a small light emission intensity is used. However, with the printing light source having a small light emission intensity, an exposure time of a properly exposed frame or of an over exposed frame is increased, thereby preventing high speed printing.

In order to deal with the above problems, a method has been proposed as disclosed in Japanese Patent Publication No. 59-7374, wherein a light source having a large light emission intensity is used, and an ND filter is used for an under exposed frame to elongate an exposure time. With this printing method, an original frame to be printed is first supplied to a print station to calculate an LATD of each color of the original frame. Next, if the minimum value of LATDs for the three colors is lower than the transmittance density of a normal control frame, the density value of an ND filter corresponding to the difference between the minimum value and the transmittance density of the normal control frame is obtained. An ND filter having such a density value is inserted into the printing path to print an under exposed frame.

The density of an ND filter is lowered by a time dependent change such as fading and stains. According to the conventional method, the ND filter density is used before a time dependent change has occurred so that proper exposure control is difficult. Furthermore, the ND filter density is determined after the photometry of an original frame at the print station. Therefore, printing can be started only after an ND filter is inserted into the printing path which prevents high speed printing.

SUMMARY OF THE INVENTION

It is a principal object of the present invention to provide a photographic printing method and system capable of providing high precision exposure control by determining an exposure time while taking a time dependent change of an ND filter density into consideration.

It is another object of the present invention to provide a photographic printing method and system capable of printing at high speed.

In order to achieve the above and other objects of the invention, a spliced long film is loaded into a film analyzer and preliminary photometry is performed. During the preliminary photometry, an original frame of the long film is supplied to a preliminary photometry station, and a transmittance density of each point of the original frame is measured by an image sensor. An LATD is calculated from the transmittance densities. When the LATD of a frame is lower than a reference value, the density of an ND filter to be used for printing is determined in accordance with a difference between the reference value and the calculated LATD. By using a transmittance density at each point, an exposure correction amount for the LATD is calculated. The exposure correction amount and ND filter density are written into a storage medium.

The storage medium and long film are set in an auto-printer. At the auto-printer, while an original frame of the long film is transported toward a print station, an ND filter having the ND filter density read from the storage medium is set in the printing path for a low LATD frame. Main photometry is performed using the ND filter for the low LATD frame supplied to the print station to measure an LATD. From this LATD and the exposure correction amount read from the storage medium, an exposure time is calculated. The frame is then printed by maintaining the ND filter inserted into the printing path. An ND filter is not used for a properly exposed frame or for an over exposed frame.

In the case of color film, exposure correction amounts of three primary colors (red, green, blue) are calculated, and an ND filter density is determined in accordance with the minimum value of the three-color LATDs. If an auto-printer has only one kind of an ND filter, information on whether the ND filter is used or not, is used in place of the ND filter density. If a combination of a plurality of ND filters is used, information representing the combination of ND filters may be used in place of the ND filter density.

The ND filter density is determined at the preliminary photometry station. At the auto-printer, the ND filter is set in the printing path while the original frame is transported toward the print station. Accordingly, a setting time of an ND filter is not necessary, thereby providing high speed printing. Furthermore, an exposure time is calculated by using the actual density of an ND filter when main photometry is performed by using the ND filter. Accordingly, a correct exposure amount can be obtained by compensating for the time dependent change of the ND filter density.

According to a preferred embodiment of the present invention, the auto-printer includes a preliminary photometry station upstream of a print station. The preliminary photometry performed at the preliminary photometry station determines an ND filter density for a low LATD frame. While the low LATD frame moves toward the print station, an ND filter having a density determined in advance is set in the printing path.

BRIEF DESCRIPTION OF THE DRAWINGS

The above and other objects and advantages of the present invention will become apparent from the detailed description of the preferred embodiments when read in conjunction with the accompanying drawings, in which.

DETAILED DESCRIPTION OF THE PREFERRED EMBODIMENTS

Figure 1:
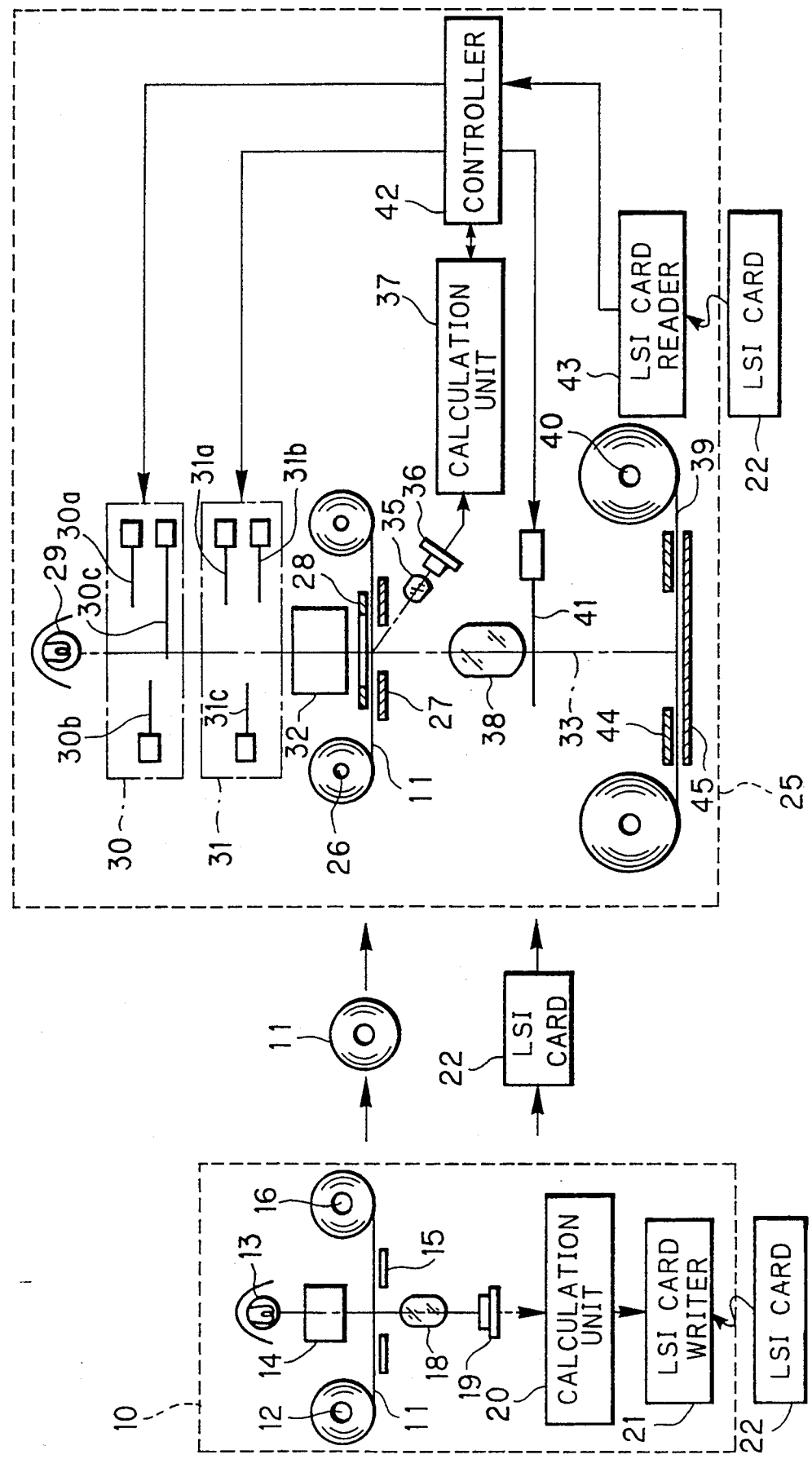
FIG. 1 is a schematic diagram showing a photographic printing system embodying the present invention.

A spliced long film 11 is developed by a film processor (not shown) and undergoes a film inspection by a notch puncher, which is well known in the art. The film inspection judges whether each frame is to be printed. When a frame is to be printed, a notch is formed on a side portion on a central line of the frame. The notch indicates that the frame is to be printed, and shows the position of the center line of the frame.

After the film inspection, the long film 11 is supplied to a film analyzer 10. The long film 11 is pulled out of a supply reel 12 one frame after another, and an original frame having a notch formed therein is automatically supplied to a preliminary photometry station. A white light source 13 and a mixing box 14 are disposed above the preliminary photometry station, and a film mask 15 for masking the peripheral area of each frame is disposed below the preliminary photometry station. An original frame from the preliminary photometry station is wound about a take-up reel 16.

A lens 18 focusses an image of an original frame supplied to the preliminary photometry station onto an image pickup plane of a color image sensor 19. The color image sensor 19 is constituted by a plurality of pixels and a mosaic filter disposed above the pixels. The mosaic filter separates pixels into red, green, and blue pixels which are alternately disposed. A block of $3 \times 3$ picture elements corresponds to one measuring point. In measuring one measuring point, signal charges from three pixels of the same color are read and added together, to thereby perform a quasi three primary color separation and measurement.

The color image sensor 19 sends three color signals at each point to a calculation unit 20. The calculation unit 20 logarithmically converts the three color signals to calculate a transmittance density (strictly, a value proportional to a transmittance density) at each point for each color. The calculation unit 20 calculates an average value (grey density) of three color densities at each point, and in accordance with the average values, calculates characteristic values such as a minimum density, a maximum density, and an average transmittance density of a predetermined area. This area may be the whole area, an upper half area, a lower half area, a central area, a peripheral area, a right half area, or a left half area of each frame.

The calculation unit 20 classifies scenes in accordance with these characteristic values, and calculates an exposure correction amount for an average transmittance density of the whole area (LATD) for each color by using a calculation equation provided for each scene classification. For a low LATD frame having a minimum value of an LATD for each color which is smaller than a reference value, the density of an ND filter to be used at printing exposure is determined from a difference between the reference value and the minimum value. The exposure correction amount and ND filter density are written into an LSI card 22 by an LSI card writer 21.

In this embodiment, a transmittance density of a normal control frame is used as the reference value. Therefore, a low LATD frame is an under exposed frame. From the transmittance density and the minimum value, the ND filter density is determined. The normal control frame is called a Bull's eye negative frame to be used for setting the conditions of a printer, and is obtained by applying a proper exposure to a color paper.

The long film 11 and the LSI card 22 from the film analyzer 10 are set into an auto-printer 25 of a white subtractive color type. The auto-printer 25 pulls out the long film 11 from a supply reel 26 and sets each original frame to a print station. A film mask 27 and a film press plate 28 are disposed at the print station. Before the main photometry and printing are performed, the film press plate 28 is driven by a solenoid to push the peripheral area of an original frame to be printed against the film mask 27.

A printing path 33 extends between a white light source 29 and the printing station. An ND filter unit 30, a cut-filter unit 31, and a mixing box 32 are disposed in the printing path 33. The ND filter unit 30 includes a plurality of ND filters having a different transmittance density, and a single ND filter or a combination of ND filters are selectively used. In the embodiment described herein, an ND filter 30a having a transmittance density of "0.1", an ND filter 30b having a transmittance density of "0.2" and an ND filter 30c having a transmittance density of "0.4" are used. The transmittance density can be changed from "0" to "0.7" at a pitch of "0.1".

In accordance with an ND filter density read from the LSI card 22, a desired ND filter is set in the printing path 33 while an under exposed frame is transported toward the print station. No ND filter is inserted into the printing path for a properly exposed frame having an LATD which is the same as the transmittance density (normal transmittance density) of a normal control frame or for an over exposed frame having an LATD higher than the normal transmittance density.

The cut-filter unit 31 includes a blue cut-filter 31a for preventing transmission of blue light, a green cut-filter 31b for preventing transmission of green light, and a red cut-filter 31c for preventing transmission of red light. Each cut-filter is inserted into the printing path 33 when the exposure of the corresponding color is terminated.

An LATD for each color of an original frame supplied to the print station is measured by a photometry unit constituted by a lens 35 and a photometry sensor 36, and sent to a calculation unit 37. The calculation unit 37 calculates an exposure time of each color from the following equation, by using the LATD of each color and the exposure correction amount of each color read from the LSI card 22:

$$Ti = TNi \times 10^{Di-DNi} \times 10^{DAi}$$

where:
i: one of blue, green, and red colors;
Ti: an exposure time of an original frame to be printed;
TNi: an exposure time of a normal control frame;
Di: an LATD of an original frame to be printed;
DNi: a transmittance density of a normal control frame;
DAi: an exposure correction amount.

The LATD of an original frame to be printed, Di, corresponding to an under exposed frame is expressed by the following equation where Di is measured by using an ND filter:

$$Di = Di' + DFi - \Delta DFi$$

where:
Di': an LATD measured without using an ND filter;
DFi: an original density of an ND filter;
$\Delta DFi$: a density of an ND filter lowered by a time dependent change.

Conventionally, Di has been calculated from Di' and DFi obtained by measuring an LATD of an under exposed frame without using an ND filter. Therefore, Di increases by $\Delta DFi$.

An original frame supplied to the print station is printed via a printing lens 38 onto a color paper at an exposure time Ti calculated for each color. After a printing operation, the color paper 39 is fed one frame at a time and wound about a take-up reel 40. Under the printing lens 38, a black shutter 41 for starting an exposure is disposed.

A controller 42 controls various parts of the auto-printer 25, such as the ND filter unit 30, cut-filter unit 31, and black shutter 41. The exposure correction amount, ND filter density, and the like are set in the controller 42 based on information read from the LSI card 22 by an LSI card reader 43. Reference numeral 44 represents a paper mask, and reference numeral 45 represents a paper press plate.

Figure 2:
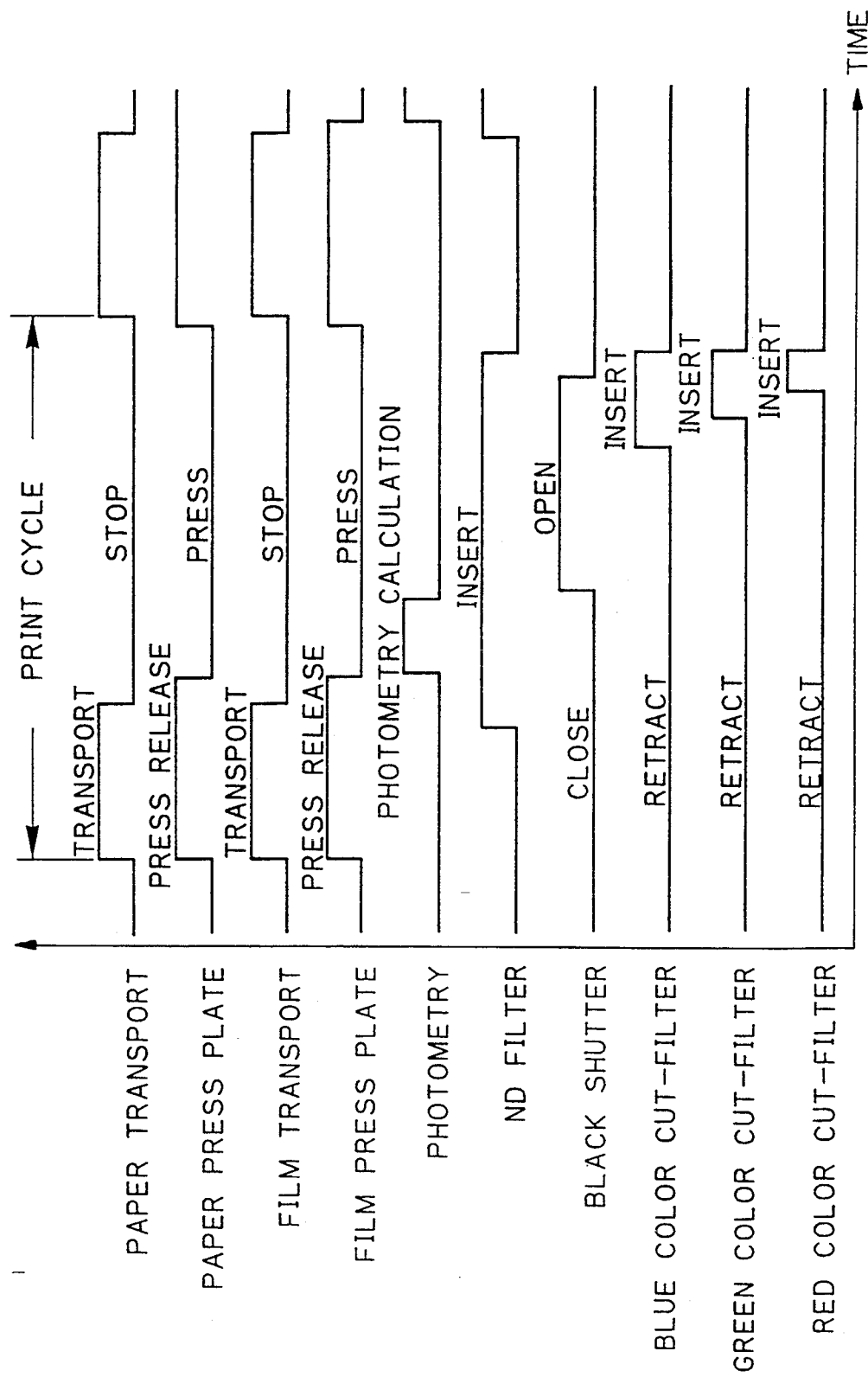
FIG. 2 is a timing chart explaining the operation of the auto-printer shown in FIG. 1.

The operation of the embodiment will be briefly described with reference to FIG. 2. A spliced long film 11 and an LSI card 22 are set in the film analyzer 10. Each point of an original frame supplied to the preliminary photometry station is measured by the color image sensor 19, and the measured results are sent to the calculation unit 20 to derive therefrom various characteristic values. In accordance with the characteristic values, an exposure correction amount DAi is calculated. For an under exposed frame having a minimum value of the LATDs for the three colors lower than the transmittance density of a predetermined normal control frame, the density of an ND filter is determined so as to elongate an exposure time. The ND filter density corresponds to a difference between the minimum LATD and the transmittance density of the normal control frame. The difference value is adjusted so that the first order smaller than a decimal point value has an integer multiplication of "0.1", by counting a fraction over 0.5 as one and disregarding the rest. Since the maximum usable density of an ND filter is "0.7", if the difference exceeds "0.7", the value is limited to "0.7".

Following the preliminary photometry operation performed by the film analyzer 10, the long film 11 and the LSI card 22 are set in the auto-printer 25. The long film 11 is pulled one frame at a time to set each original frame to the print station. While each original frame is set at the print station, the exposure correction amount DAi and ND filter density are read from the LSI card 22. For an under exposed frame, the controller 42 determines a combination of ND filters in accordance with the ND filter density. The ND filter unit 30 is then driven to insert necessary ND filters into the printing path 33. When a properly exposed frame or an over exposed frame is set at the print station, the long film 11 and color paper 39 are pushed by the film press plate 28 and paper press plate 45 against the print plane and exposure plane, respectively. Thereafter, the main photometry operation is initiated using the photometry sensor 36 to begin the calculation of LATDs for red, green, and blue colors. By using the three-color LATDs and exposure correction amounts, exposure times Ti of the three colors are calculated from the above-described equation.

After the exposure time calculation, the controller 42 retracts the black shutter 41 from the printing path 33 to project the original frame set at the print station onto the color paper 39. After the lapse of an exposure time of, for example, blue color, the controller 42 controls the cut-filter unit 31 to insert the blue cut-filter 31a into the printing path 33 to terminate an exposure of blue light. In this manner, when all three cut-filters 31a to 31c are inserted into the printing path 33, the black shutter 41 is closed.

After the black shutter 41 is closed, the cut-filter unit 31 is activated to retract the cut-filters from the printing path 33. The long film 11 and the color paper 39 are again transported to start printing the next original frame.

In the case of an under exposed frame, while it is transported toward the print station, an ND filter is set. LATDs of three colors are measured by using the ND filter. If the ND filter has a time dependent change, the LATDs are measured under the condition of the time dependent change. As a result, the value of an LATD for each color lowers by the amount corresponding to the lowered density, and so the exposure time is shortened. In this manner, the time dependent change of the ND filter is compensated when measuring each LATD so that a proper exposure time can be calculated.

The under exposed frame is printed with the ND filter inserted into the printing path. After the black shutter 41 is closed and the printing is completed, the ND filter and cut-filters are retracted from the printing path 33.

Figure 3:
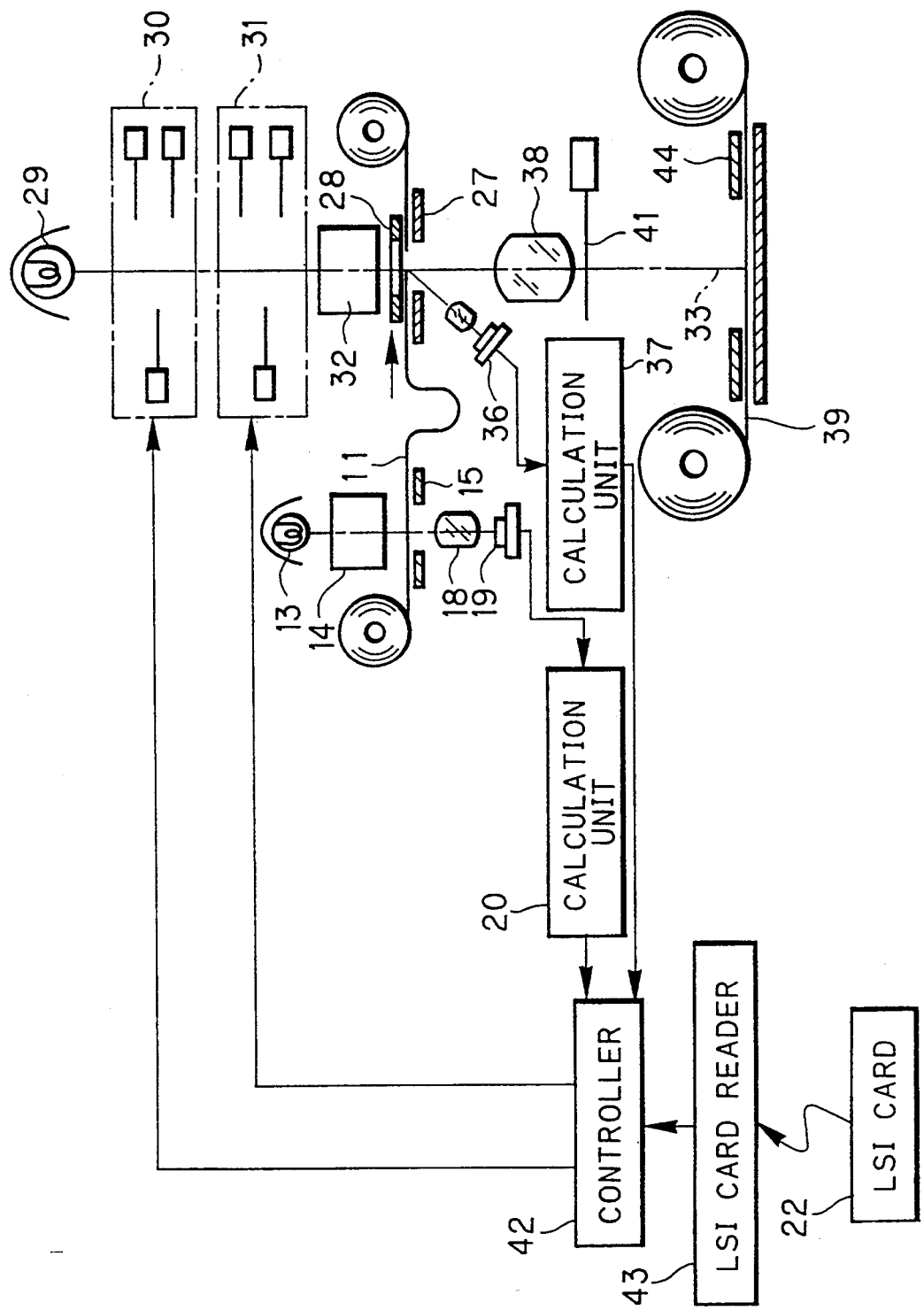
FIG. 3 is a schematic diagram showing an auto-printer provided with a preliminary photometry unit.

FIG. 3 shows an auto-printer having a preliminary photometry unit. The auto-printer is of the type that a film analyzer is assembled therewith. Like elements to those shown in FIG. 1 are represented by identical reference numerals. Each original frame of a long film 11 is subjected to the preliminary photometry at the preliminary photometry station to determine an exposure correction amount and an ND filter density. While the original frame is transported from the preliminary photometry station to a position one frame before the print station, an ND filter having the determined density is inserted into the printing path 33 when the original frame is an under exposed frame. Like the embodiment shown in FIG. 1, LATDs and exposure times are measured, and the black shutter is opened to start print exposure.

The density of an ND filter is determined in accordance with a difference between the minimum value of three color LATDs and the grey density of a normal control frame. Instead of the minimum value of the three color LATDs, an average value of three color LATDs, i.e., a grey LATD may be used. Furthermore, three color exposure correction amounts contain not only color correction but also density correction. These corrections may be separated as a density correction amount and a color correction amount. A density correction amount for correcting three colors by the same amount may be used.

In the above embodiments, the transmittance density of a normal control frame is used as the reference value, and an under exposed frame is used as an example of an original frame having an LATD smaller than the reference value. The reference value can be determined according to the intensity of a printing light source. If a printing light source having a high light emission intensity is used, the reference value can become large. In this case, photometry and printing may be performed by using an ND filter even in the case of a properly exposed frame having the same LATD as the transmittance density of a normal control frame and an over exposed frame having an LATD slightly larger than the transmittance density of a normal control frame.

Although the present invention has been described with reference to the preferred embodiments shown in the drawings, the invention should not be limited by the embodiments but, on the contrary, various modifications, changes, combinations and the like of the present invention can be effected without departing from the spirit and scope of the invention.

We claim:

1. A photographic printing method comprising the steps of:
   performing a preliminary photometry operation on an original frame of a spliced long film;
   obtaining a large area transmittance density, LATD, of said original frame by said preliminary photometry operation;
   determining a required density for an ND filter to be used for printing when said original frame is a low LATD frame having an LATD lower than a reference value;
   setting said original frame to a print station following said preliminary photometry operation when said original frame corresponds to said low LATD frame;
   inserting said ND filter having said required density into a printing path immediately before said low LATD frame is set to said print station;
   performing a main photometry operation on said original frame set to said print station, when said ND filter is set in said printing path, said main photometry operation being performed using said ND filter;
   determining an exposure time from an LATD obtained by said main photometry operation; and
   printing an image of said original frame onto a photographic paper by projecting said image onto said photographic paper for a period of time corresponding to said exposure time, when said original frame corresponds to said low LATD frame, said image of said low LATD frame being projected via said ND filter onto said photographic paper.

2. The photographic printing method according to claim 1, further comprising the step of calculating an exposure correction amount by said preliminary photometry operation, said exposure correction amount and said LATD obtained by said main photometry operation being used for determining said exposure time.

3. The photographic printing method according to claim 2, further comprising the step of splicing a plurality of color roll films together to obtain said spliced long film, and wherein said photographic paper is color paper.

4. The photographic printing method according to claim 3, wherein steps for determining said LATD obtained by said preliminary photometry operation, said exposure correction amount, and said exposure time are performed for red, green, and blue colors, and the step of determining said required density of said ND filter is performed in accordance with a difference between a minimum value of said LATD associated with one of said red, green and blue colors, and said reference value.

5. The photographic printing method according to claim 4, further comprising the step of setting said reference value to a transmittance density of a normal control frame used for setting printing conditions.

6. The photographic printing method according to claim 5, wherein said preliminary photometry operation is performed at a preliminary photometry station provided at a film analyzer for obtaining said exposure correction amount for each of said red, green and blue colors, and said printing operation is performed at said print station which is provided at an auto-printer separated from said film analyzer.

7. The photographic printing method according to claim 5, wherein said preliminary photometry station and said print station are provided on an auto-printer.

8. A photographic printing system for printing color spliced long film having a plurality of original frames, said photographic printing system comprising:

a film analyzer for performing a preliminary photometry operation, said film analyzer comprising:

a preliminary photometry station;

a first film transporting device for transporting said color spliced long film one frame after another to said preliminary photometry station, and for sequentially setting each of said original frames at said preliminary photometry station;

a color preliminary photometry device for performing a preliminary photometry operation on each of said original frames set to said preliminary photometry station;

a first calculator for calculating exposure correction amounts and large area transmittance densities, LATDs, for red, green and blue colors, respectively, from the preliminary photometry operation results obtained by said color preliminary photometry device;

a second calculator for determining a required density of an ND filter to be used for printing, in accordance with a minimum value of one of said LATDs respectively corresponding to said red, green, and blue colors, when an original frame among said plurality of original frames is a low LATD frame having said minimum value lower than a reference value; and a write circuit for writing said exposure correction amounts for said red, green, and blue colors, respectively, and said required density of said ND filter into a data storage medium; and an auto-printer for loading said color spliced long film processed by said film analyzer and for sequentially printing each of said original frames onto a color paper, said auto-printer comprising:

a read circuit for receiving said data storage medium used by said film analyzer and for reading from said data storage medium said exposure correction amounts for said red, green, and blue colors, respectively, and said required density of said ND filter when said original frame corresponds to said low LATD frame;

a print station for sequentially setting each of said original frames;

a printing light source for illuminating each of said original frames set to said print station;

a printing path extending between said printing light source and said color paper, said print station being located within said printing path;

a second film transporting device for transporting said color spliced long film one frame after another to said print station, and for sequentially setting each of said original frames at said print station;

a device for inserting said ND filter having said required density between said print station and said printing light source, immediately before said low LATD frame is set to said print station, when said original frame corresponds to said low LATD frame;

a color main photometry device for performing a main photometry operation on each of said original frames set to said print station to obtain LATDs respectively corresponding to said red, green, and blue colors, wherein said ND filter remains inserted for performing said main photometry operation when said original frame corresponds to said low LATD frame;

a second calculator for calculating exposure times of said red, green, and blue colors, respectively, in accordance with said LATDs respectively corresponding to said red, green, and blue colors, obtained by said main photometry operation, and said exposure correction amounts respectively corresponding to said red, green, and blue colors, read from said data storage medium; and an exposure control device for controlling an exposure time of each of said red, green, and blue colors in accordance with said exposure times of said red, green, and blue colors, respectively.

9. The photographic printing system according to claim 8, wherein said required density of said ND filter is determined in accordance with a difference between said minimum value and said reference value.

10. The photographic printing system according to claim 9, wherein said exposure control device includes a black shutter, a red cut-filter, a green cut-filter, and a blue cut-filter, wherein said black shutter is disposed between said print station and said color paper and retracted from said printing path during printing, and wherein each of said red cut-filter, said green cut-filter and said blue cut-filter is disposed between said printing light source and an exposure station of said exposure control device and inserted into said printing path when an exposure time of a corresponding color lapses.

11. The photographic printing system according to claim 10, wherein said reference value is a transmittance density of a normal control frame to be used for setting printing conditions.

* * * * *